United States Patent
Miller (10) Patent No.: US 8,123,282 B1
(45) Date of Patent: Feb. 28, 2012

(54) SEMI-TRAILER SECTIONAL DECKING SYSTEM

(75) Inventor: Mitchell A. Miller, Eagan, MN (US)

(73) Assignee: Doubledeck Trailer, LLC, Eagan, MN (US)

( * ) Notice: Subject to any disclaimer, the term of this patent is extended or adjusted under 35 U.S.C. 154(b) by 0 days.

(21) Appl. No.: 12/895,234

(22) Filed: Sep. 30, 2010

(51) Int. Cl.
*B62D 33/04* (2006.01)

(52) U.S. Cl. .................................. 296/181.3; 296/24.45

(58) Field of Classification Search ............... 296/24.44, 296/24.45, 181.3; 410/3, 5, 7, 8, 26, 52, 410/11, 23
See application file for complete search history.

(56) References Cited

U.S. PATENT DOCUMENTS

| | | | |
|---|---|---|---|
| 2,432,228 A | 12/1947 | De Lano | |
| 3,027,580 A | 4/1962 | Haack | |
| 3,895,587 A * | 7/1975 | Bell | 410/26 |
| 4,014,444 A | 3/1977 | Jakel | |
| 4,032,167 A | 6/1977 | Chereda | |
| 4,343,401 A | 8/1982 | Paulyson | |
| 4,786,222 A | 11/1988 | Blodgett | |
| 4,874,284 A | 10/1989 | New, Jr. | |
| 4,966,510 A | 10/1990 | Johnson, Jr. | |
| 5,106,246 A | 4/1992 | Chance | |
| 5,553,762 A | 9/1996 | Brown | |
| 5,669,745 A | 9/1997 | Anderson | |
| 5,907,276 A | 5/1999 | Lance | |
| 6,059,344 A | 5/2000 | Radosevich | |
| 6,217,053 B1 | 4/2001 | Forsythe et al. | |
| 6,368,034 B1 | 4/2002 | Frye | |
| 6,524,055 B1 | 2/2003 | Overbye | |
| 7,188,817 B2 * | 3/2007 | Henning | 248/346.02 |

OTHER PUBLICATIONS

ANCRA International, Interior Van Solutions: Deck & Loading Systems, Catalog No. 210E, Sep. 30, 2010, catalog cover page and pp. 36-37, http://www.ancra.com/truck/cat_index.asp.

Kinedyne Corporation, Interior Van: Kaptive Beam, Logistics Track and Decking/Shoring Beams, Sep. 30, 2010, 3 pages, http://www.kinedyne.com/interiorvan/kaptive-beam.asp.

* cited by examiner

*Primary Examiner* — Lori Lyjak
(74) *Attorney, Agent, or Firm* — Moss & Barnett (57) ABSTRACT

The present invention is a decking system that provides a height adjustable, sectional second floor in a semi-trailer for hauling freight. The system utilizes vertical tracks mounted on the inside of each side of the trailer. Each track on one side of the trailer is transversely aligned with a corresponding track on the opposite side of the trailer. E-bars are secured to and between opposed corresponding tracks for adjustable, vertical movement. Deck sections are mounted on the E-bars to support cargo. The deck sections may be positioned all at the same height or at different heights or may be inclined to form a ramp for loading or unloading cargo.

13 Claims, 13 Drawing Sheets

SEMI-TRAILER SECTIONAL DECKING SYSTEM

FIELD OF THE INVENTION

The present invention is a decking system that provides a raised, height adjustable sectional second floor in a semi-trailer for hauling freight.

BACKGROUND OF THE INVENTION

Cargo transit costs are a burden that affects the price of most goods. Many goods must be shipped several times before reaching the ultimate buyer—from manufacturer to wholesaler to retailer to buyer. A great deal of this transit is by tractor-trailer. Further, there is a need to find loads both to and from the point of destination to maximize use of the trailer and increase cost efficiency.

To minimize transit expenses, various attempts have been made to utilize a second floor or deck in the containers, such as is disclosed by U.S. Pat. No. 4,343,401 to Paulyson. Paulyson discloses the use of a number of crossbeams supported between opposed mounting tracks. The crossbeams can be supported on the tracks at a selected height. Track sections are mounted transversely to the crossbeams. In use, the crossbeams are all at the same height so that wheeled cargo of the same size may be stored on the tracks via a ramp extending from the loading dock to the track deck and wheeled vehicles may be stored below the second deck. The Paulyson system, as disclosed, is limited to a single use of wheeled vehicles and is not adaptable for other cargo. With Paulyson, the second deck is necessarily at the same height to accommodate equal sized wheeled vehicles both above and below the second deck. This limits the usefulness of the system for other cargo and cargo of differing sizes.

U.S. Pat. No. 6,524,055 to Overbye reflects a system similar to Paulson—a second deck for supporting motorized vehicles consisting of three narrow spaced tracks running the length of the trailer, mounted on crossbeams secured to logistics posts. Other examples of similar systems include U.S. Pat. No. 4,786,222 to Blodgett and U.S. Pat. No. 5,669,745 to Anderson.

U.S. Pat. No. 4,966,510 to Johnson, Jr. and U.S. Pat. No. 2,432,228 to S. De Lano disclose a second deck with a front section fixed in height and a back section pivotally mounted to be used as a ramp until loaded. When the back deck section is loaded, it is pivoted to its transit position with a motor vehicle supported above it, permitting another motor vehicle to be loaded below the back deck section. U.S. Pat. No. 6,368,034 discloses a similar system except there is no front second deck section. U.S. Pat. No. 5,106,246 discloses an entire second deck that pivots for loading and unloading of wheeled cargo.

Some trailers, such as those made by Kenodyne, are equipped with just crossbeams and logistics posts and are used to transport palletized cargo which is directly stacked on the crossbeams. Each pallet must be secured to the crossbeams, which is time consuming. Further, not all pallets are of the same size and some pallets may not be able to be supported by the crossbars, limiting use of the crossbars to support cargo.

Other trailers, such as those provided by Ancra, utilize a series of rectangular, longitudinally spaced deck sections pivotally mounted along the interior side walls of a trailer, about mid-height. The deck sections are stored in a vertical position but pivot inward towards the center of the trailer into a horizontal position supported on cross beams. However, these deck sections are fixed in place and cannot be moved without special tools, limiting the adjustability of the deck height.

There remains a need for a modular deck system that can be quickly adjusted to provide a single level deck at a desired height, a ramp for loading and unloading cargo, or a set of discrete deck sections capable of supporting cargo of different sizes, shapes and types to increase transport efficiencies.

SUMMARY OF THE INVENTION

The present invention is a modular deck system in a semi-trailer for storing and hauling freight.

Semi-trailers generally have the shape of a hollow rectangular prism with rectangular floor, ceiling and side and end walls. In the present invention, opposed sets of vertical tracks or "logistic posts" are mounted on the inside surface of each side wall of the trailer in generally evenly spaced relation along the length of the trailer, typically sixteen inches on center, but other distances are possible. The tracks on one side of the trailer are generally transversely aligned with a corresponding track on the opposite side wall of the trailer in facing relation.

Support beams or "E-bars" having a length generally slightly less than the inside width of the trailer are mounted between and to selected, transversely aligned pairs of logistics posts. A ratchet mechanism is secured to each end of each E-bar and is designed to slidably or releasably engage a logistics post. The E-bars are mounted within the trailer with a first end of the E-bar slidably or releasably attached by a first ratchet mechanism to a first of a pair of corresponding, transversely aligned logistics posts, and a second end of the E-bar is slidably or releasably attached by a second ratchet mechanism to a second of the pair of corresponding logistics posts. E-bars may be mounted to and between each pair of corresponding logistics posts or selected pairs of logistics posts.

The releaseable ratchet mechanism permits the E-bars to be incrementally vertically raised or lowered on the logistics posts to adjust the height of the E-bars from the floor and ceiling. The E-bars can also be positioned immediately below the ceiling for storage.

Deck sections are designed to be mounted on top of two or more generally proximate E-bars to create a section of raised floor to support cargo. The panels may be any width less than the width of the inside of the trailer and deep enough to engage at least two spaced E-bars along the length of the trailer to be supported thereon.

Each deck section may be independently, selectively vertically adjusted to create a single horizontal surface for storage of freight or may be vertically staggered to create different levels of deck sections to accommodate different sized cargo. Adjacent E-bars may also be stepped to cause a deck section to be inclined to provide a ramp to load or unload freight.

BRIEF DESCRIPTION OF THE DRAWINGS

Referring now to the drawings, wherein like reference numerals indicate corresponding structure through the several views.

DETAILED DESCRIPTION OF THE PREFERRED EMBODIMENT

The present invention is a decking system that provides a height adjustable, sectional second floor in a semi-trailer for hauling freight. Even though numerous characteristics and advantages of the present invention have been set forth in the following description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

Figure 1:
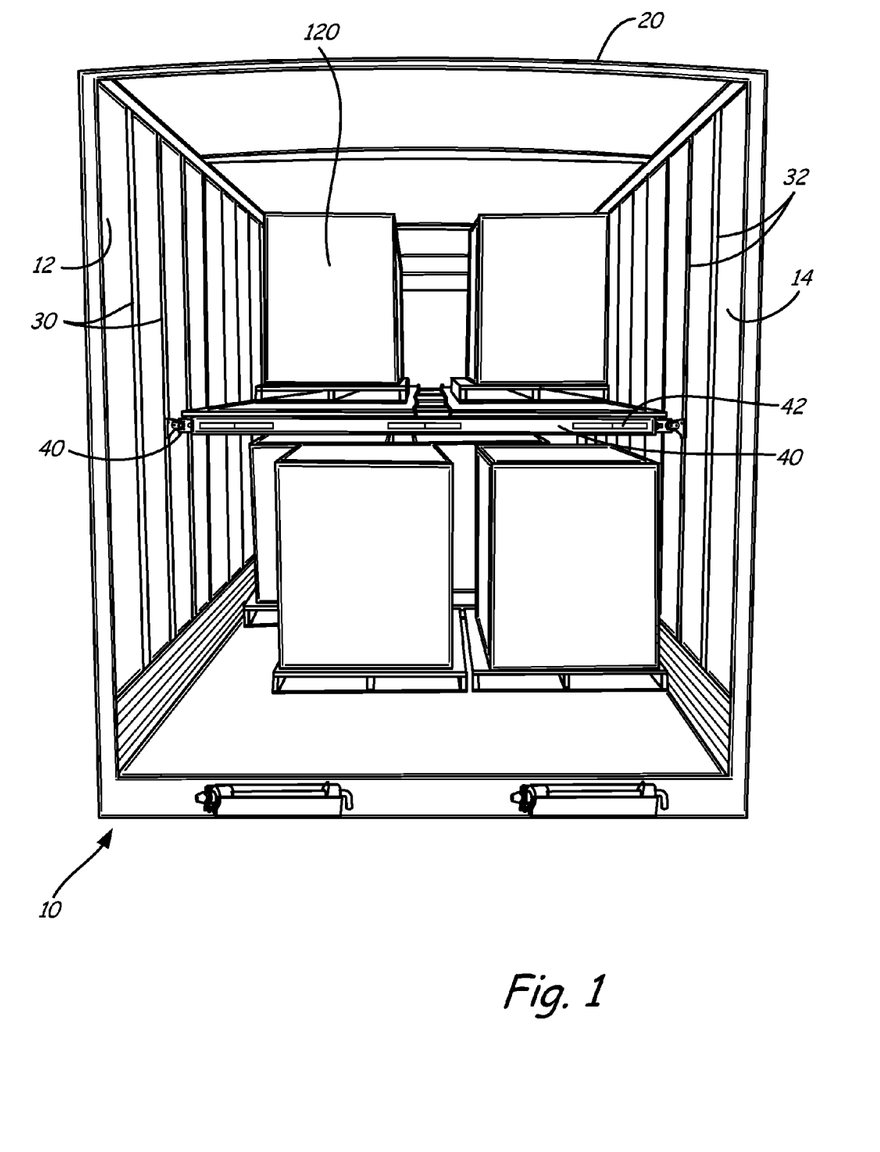
FIG. 1 is a perspective view of the deck section of the present invention supporting freight, with a section of the deck section removed to disclose "E-bar" support beams extending across the width of the trailer supporting the floor deck section with freight mounted thereon.

Semi-trailers generally have the shape of a hollow rectangular prism with an elongated rectangular floor, ceiling and side walls, a closed front end and an open rear doorway equipped with a door. FIG. 1 is a view of an open back end 10 of a semi-trailer 20 (with the doors removed) with the deck system of the present invention installed within the trailer.

Figure 2:
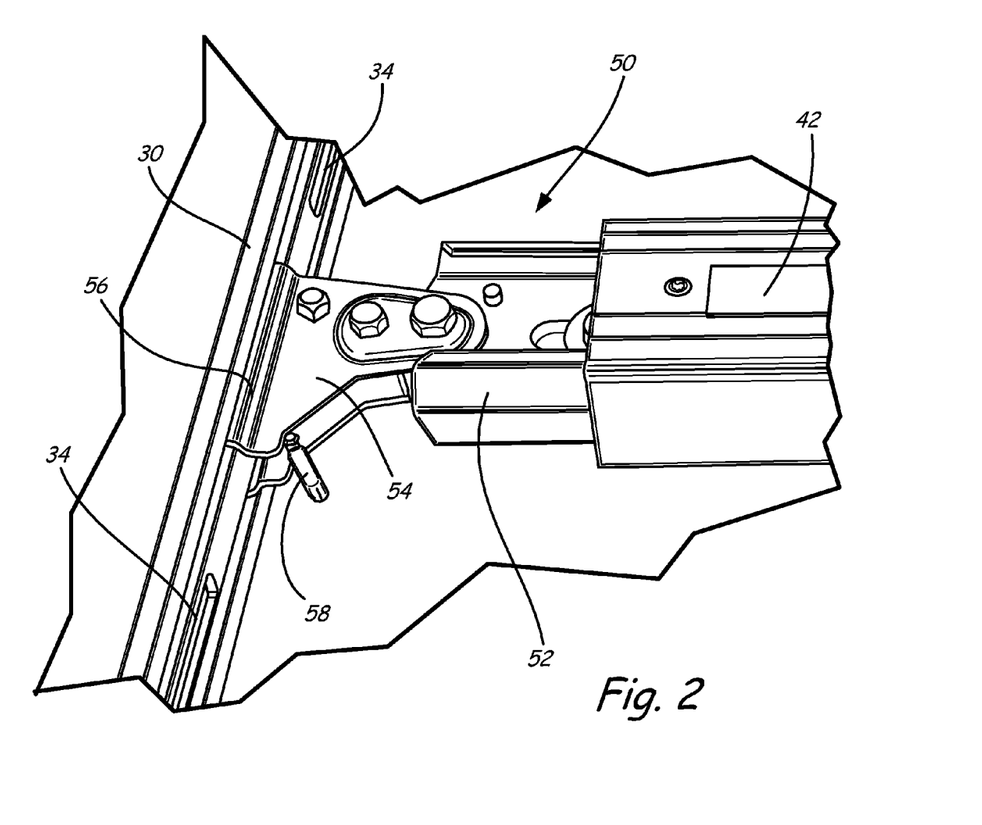
FIG. 2 is a perspective view of one end of an E-bar attached to a logistics post mounted in the interior side wall of a trailer.

Vertical tracks or "logistic posts" 30 and 32 are mounted on the inside surfaces of sides 12 and 14 of the trailer 20, respectively, in generally evenly spaced relation along the length of the trailer. As shown in FIG. 2, the logistics posts include a series of openings 34 generally evenly spaced along the length of the logistics posts to receive a stop lock (not shown). The logistics posts 30, 32 are typically spaced sixteen inches on center but other spatial distances are possible. The logistics posts 30 located on side 12 of the trailer 20 face and are generally transversely aligned with corresponding logistics posts 32 on side 14 of the trailer. The logistics posts are equipped with a series of evenly spaced slots for receiving a stop lock.

Support beams or "E-bars" 40, which are generally extruded tubes of rectangular cross-section, or extruded bars of I-cross-section with tubular ends having a generally rectangular cross-section, are transversely mounted within the trailer to and between corresponding logistics posts 30, 32. Telescopically mounted in each end of the E-bar 40 is an internal slide 52 that permits adjustment (telescoping) of the length of the E-bar 40 to accommodate different trailer widths. When trailer 20 is in use, the trailer side walls 12, 14 tend to shift or rock. The sliding relation between the E-bars 40 and internal telescoping slides 52 reduces the stress and wear and tear that would otherwise result if the E-bars 40 were simply fixed directly to the logistics posts 30, 32. The E-bars 40 have a length less than the inside width of the trailer and are positioned between and mounted to a pair of transversely aligned and corresponding logistics posts 30 and 32 by a ratchet mechanism 50 secured to each end of the E-bar.

E-Bars 40 and logistics posts 30, 32 may be connected in two general ways. E-bars may be releasably secured at each end by connectors to opposing logistics posts, so the E-bars 40 can be disconnected and then vertically repositioned at a desired location along the logistics posts 30, 32. One such connector is a "Series E-beam socket" known in the industry. Alternatively, the logistics posts 30, 32 may include slidably mounted ratchets which are capable of adjustable, vertical positioning along the logistics posts 30, 32. These "captive" ratchets attach to an end of the E-bars to prevent the E-bars form being removed from the logistics posts.

FIG. 2 discloses an internal telescoping slide 52 at the end of E-bar 40 secured to a ratchet 54 which is irremovably, slidably secured to logistics post 30 by external slide 56. The ratchet is capable of vertical adjustable movement along the logistics post 30. As described above, other means for adjusting the height of the E-bar 40 on the logistics posts 30, 32 are contemplated by the present invention.

A stop bolt, not shown, is secured within the latch 54 and is designed to releasably engage an opening 34 in the logistics post to secure the latch 54 in position with respect to the logistics post 30. The ratchet 50 may be slid upward along the logistics post to engage vertically higher openings 34, to fix the latch and E-bar 40 at increasingly higher positions within the trailer 20. The E-bars 40 can be slid to the top of the logistics posts 30, 32, adjacent the ceiling of the trailer 20, to a stored position when a second floor is not needed or would otherwise interfere with larger freight being hauled in the trailer. A pawl or release trigger 58 is used to release the stop bolt so that the latch can be lowered down the logistics post 30.

As many E-bars 40 can be mounted in the trailer 20 as there are pairs of corresponding logistics posts 30, 32 to support the E-bars 40. However, it is not necessary to mount an E-Bar to every corresponding pair of logistics posts 30, 32 to provide adequate support for the freight to be mounted on the deck system.

The E-bars 40 support a series of deck sections 70 used to support freight. Each deck section 70 is sized to be supported by at least two E-bars 40 which can be adjacent to or spaced from each other. A deck section is preferably made of a light, strong material such as aluminum or aluminum alloy. As described below, the deck sections 70 include a support platform 76 for supporting cargo 120 and flanges 80 for engaging the E-bars to hold the deck sections in place on top of the E-bars 40.

Figure 4A:
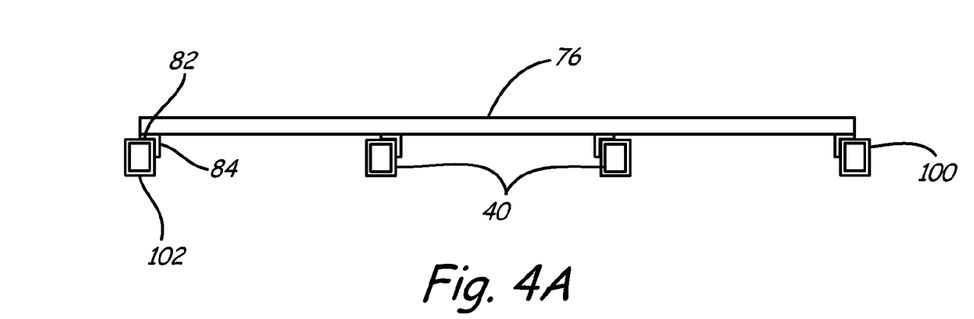
FIG. 4A is an end view of the deck section of the present invention, taken along line 4A of FIG. 4.
Figure 5:
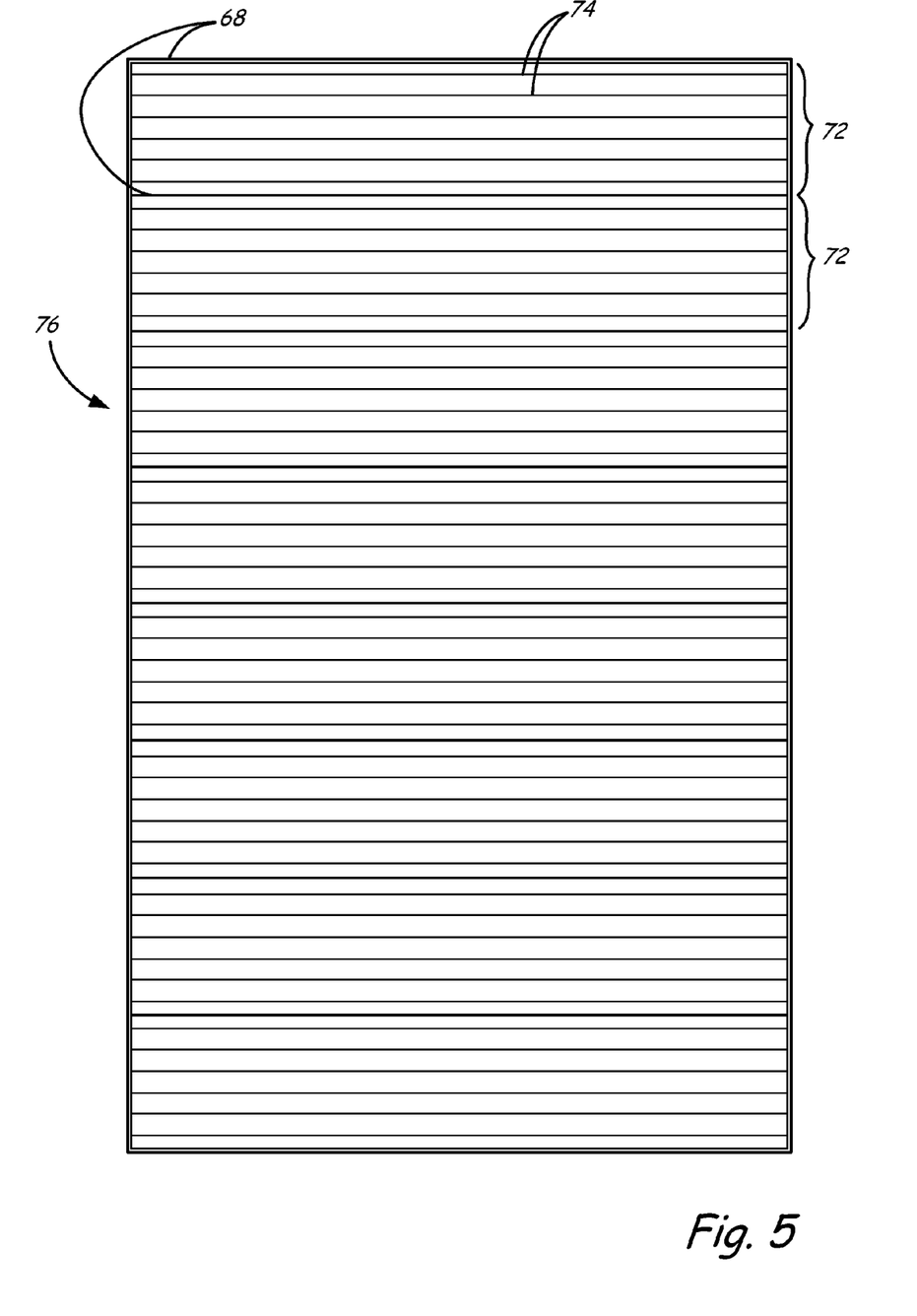
FIG. 5 is a top view of a deck section of the present invention.

One preferred embodiment of the support platform is shown at 76 in FIG. 5. Support platform 76 is constructed a series of aluminum or aluminum alloy panel sections 72 secured in side-by-side relation by bolts, welding, screws or other suitable means, to form a support platform 76. In one embodiment, the panel sections 70 are between eight and twelve inches in width (about the size used for bleacher seats) and a length sufficient to be supported and between adjoining, two spaced E-bars 40, and in one preferred embodiment, sufficient to bridge a series of four E-bars 40 as shown in FIG. 4A.

Figure 4:
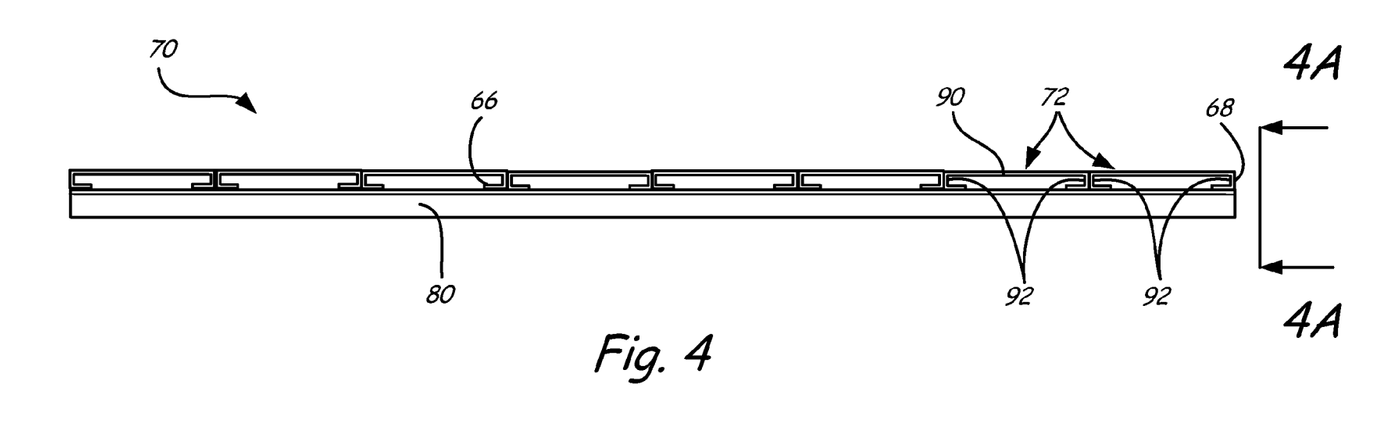
FIG. 4 is a side view of a deck section of the present invention.

As shown in FIG. 4, each panel section 72 includes a support surface 90 and sides 92 extending generally perpendicular downward from opposite longitudinal sides 68 of the panel section 72. The panel section sides 92 are bent inward at their remote end, substantially perpendicular to the downward oriented (vertical) portion of sides 92, as shown at 66 in FIG. 4. This creates a series of flat, generally planar lips 66 at the bottom of the support platform 76. The sides 92 of each panel section 72 are secured to sides 92 of adjoining panel sections 72, as shown in FIG. 4, by suitable means including without limitation, bolts, screws and welding.

As shown in FIG. 4, secured to the bottom surface of the support platform 76, formed by the lips 66, are angled or L-shaped flanges 80. Flanges 80 are transversely aligned with respect to the sides 92 of panel section 72 and are each positioned on the support platform 76 to align with and engage a corresponding E-bar 40 when the deck sections are positioned on and supported by the E-bars 40. Any desired number of flanges 80 in any desired location may be utilized.

In one embodiment, a first leg 82 of flange 80 is secured by weld or other fastening means to the bottom (lips 66) of the support platform 76. A second leg 84 of flange 80 extends generally perpendicularly downward from the bottom of support platform 76. Both legs 82 and 84 of flange 80 provide an engagement and wear surface for engaging E-bars 40.

Flanges 80 engage the E-bars 40 to prevent longitudinal movement of the deck section 70, transverse to the E-bars 40, caused by transit and other forces. The flanges 80 also strengthen support platform 76, although the support platform has suitable strength for supporting cargo even without the flanges 80. Other known means for preventing movement of the deck sections 70 with respect to the E-bars 40 are also contemplated by this invention.

Figure 6:
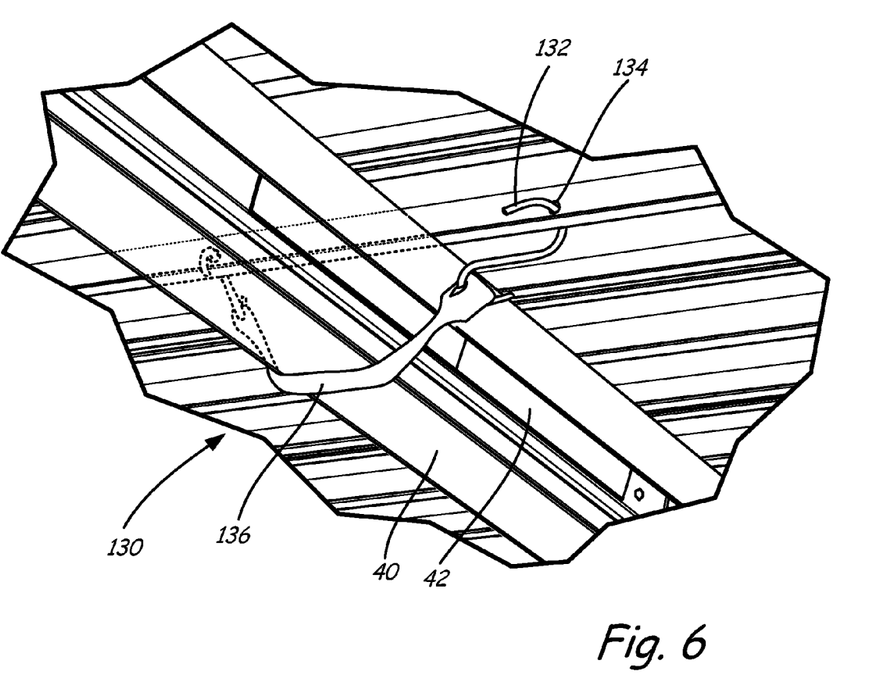
FIG. 6 is a partial perspective view of the bottom of a portion of a deck section of the present invention mounted on an E-bar with a strap securing the deck section to the E-bar.

As shown in FIG. 6, to prevent vertical movement of the deck sections 70 with respect to E-bars 40, vertical stabilization means, such as an elastic strap 130, can be used to secure the deck sections 70 to the E-bars 40. The elastic strap 130 is equipped with an elastic chord 136 equipped with a hook 132 at each end. A first hook 132 at a first end of the elastic chord 136 is secured through an opening 134 in the support platform 76 (shown in FIG. 6 as an opening in a panel section side 92 of panel section 72). The chord 136 is wrapped around an E-bar 40 and a second hook 132 at a second end of the chord 136 is secured through a second opening 134 in a different panel section side to elastically secure the deck section 70 to the E-bar 40. However, other known means for connecting and securing the deck sections 70 to the E-bars 40 are contemplated by the present invention.

Figure 3:
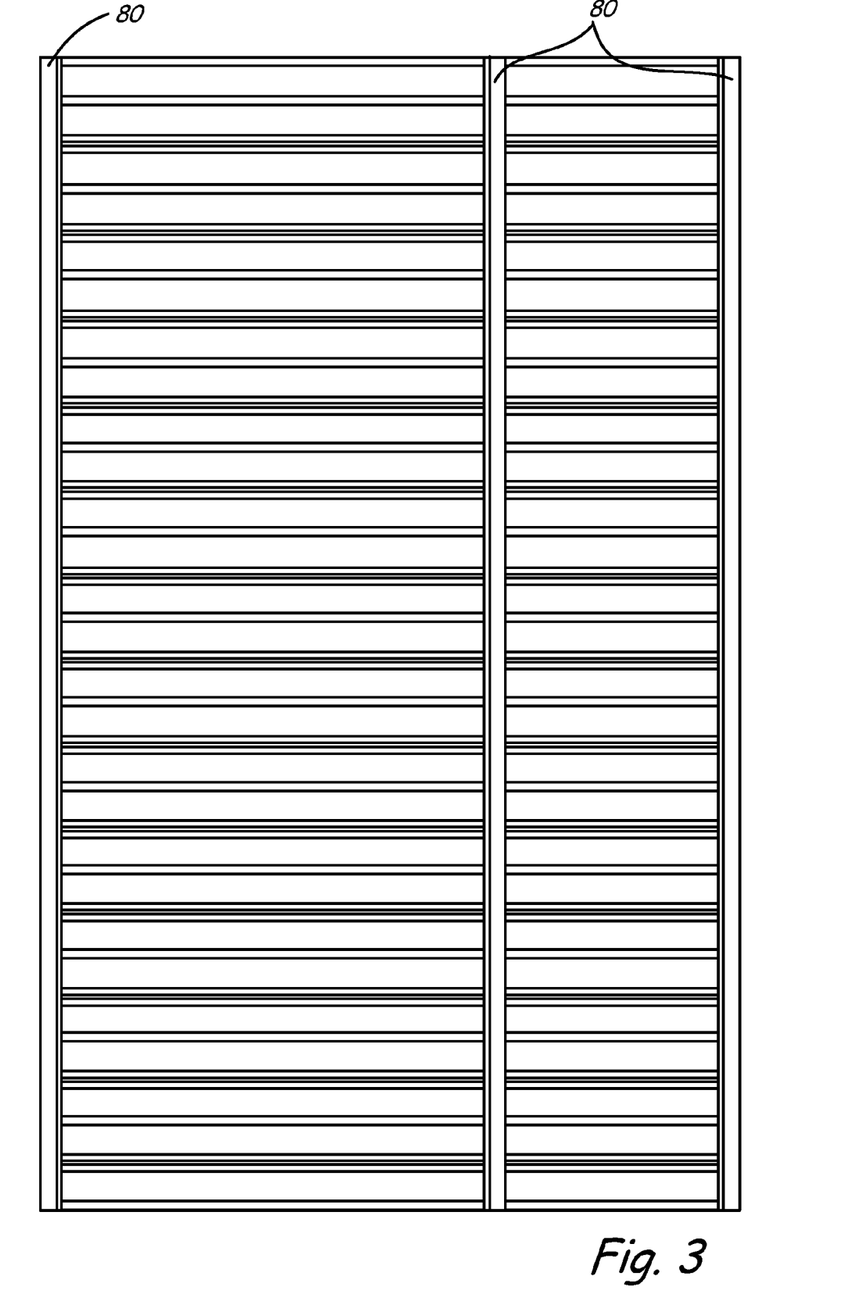
FIG. 3 is a bottom view of a deck section of the present invention.
Figure 3A:
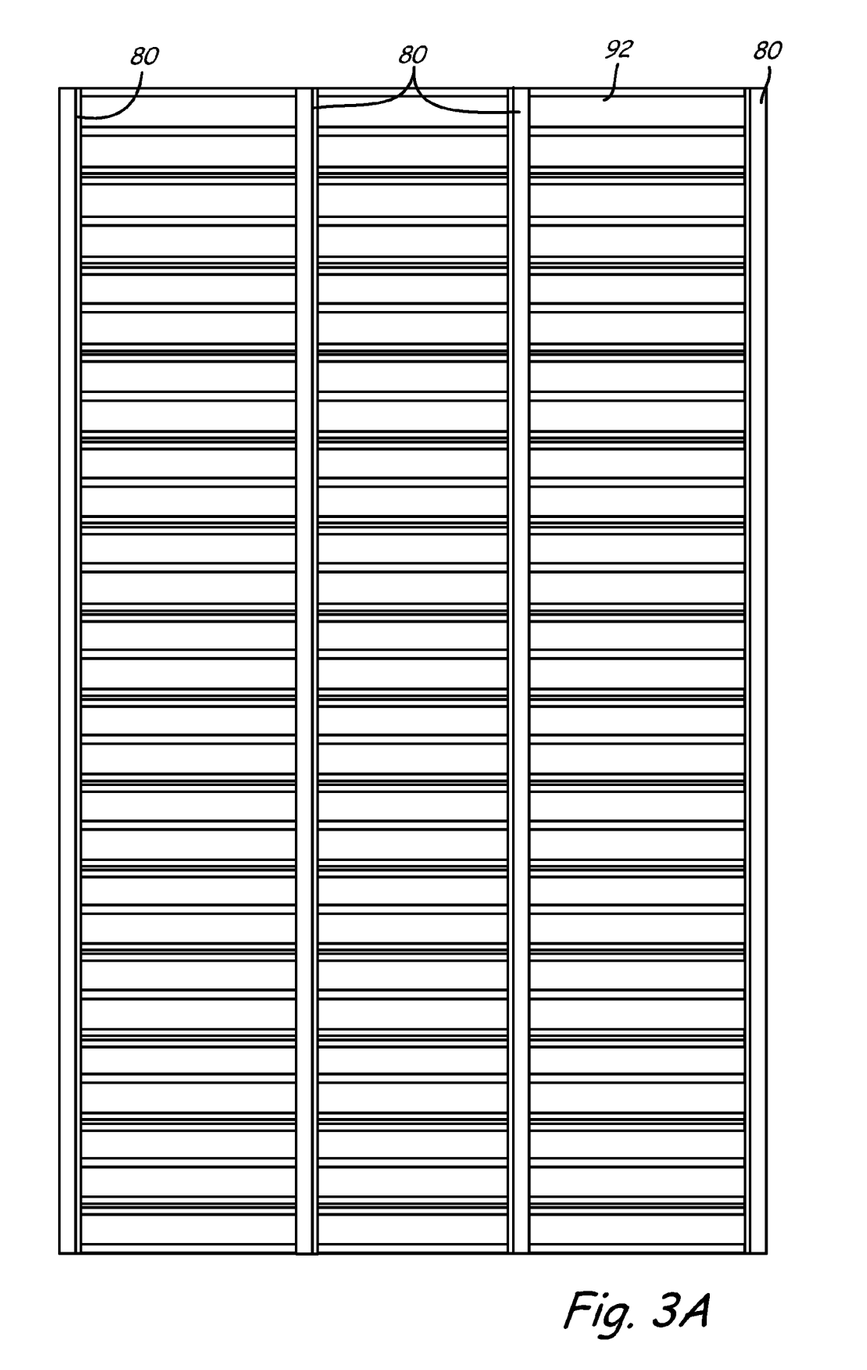
FIG. 3A is a bottom view of an alternative deck section of the present invention.

In one preferred embodiment, shown in FIG. 3A, four flanges 80 are secured on the bottom of the support platform 76. This deck section arrangement is more frequently but not exclusively used at the back of a trailer since many trailers utilize a fixed position beam in the very back. Sometimes an adjustment in the position of the flanges is required for a good fit with the E-bars 40. In another embodiment disclosed in FIG. 3, only three flanges 80 are secured to the bottom of the support platform 76. This arrangement is typically used, but not exclusively, for the remainder of the trailer deck, since the deck sections 70 are sufficiently strong with only three (or fewer) flanges and three or fewer flanges will adequately secure the deck sections 70 to the E-bars. Further, with fewer flanges, the deck section 70 is not as heavy and is easier to install or remove from the E-bars 40. (Deck sections may be removed from time to time to accommodate for different load sizes and configurations.)

The depth of a deck section 70 (along the length of the trailer), should generally match the spacing of the E-bars 40 positioned to support the deck section 70. In one preferred embodiment, shown in FIG. 4A, each support platform 70 will be partially supported on a first E-bar 100 and a last E-bar 102. Any number of E-bars may be positioned between the first E-bar 100 and last E-bar 102, as required for support. In one preferred embodiment, the deck section is forty-eight inches deep from front to back (100 to 102) and the E-bars 40 are supported on logistic posts spaced sixteen inches on center, so that a deck section will be supported on four E-bars as shown in FIG. 4A.

In a preferred embodiment, the deck section 70 should cover most of the inside width of the trailer to maximize storage capacity and minimize lateral movement of the deck section 70. In another preferred embodiment, two deck sections 70, each having a width slightly less than half the inside width of the trailer 20, are mounted between E-bars in side-by side relation with a small gap between them. Dividing the deck section into two sections provides two lighter deck sections 70 that are easier to mount on or remove from the E-bars 40, while still providing maximum floor coverage for cargo.

As shown in FIG. 5, the support platforms 76 include friction surfaces 74 along the top surface of the support platform 76 for frictionally engaging freight 120 to prevent or limit movement of the freight on the platform 76 when in transit and to increase traction when loading freight, such as golf carts or other wheeled vehicles. The frictions 74 may be grooves, ribs, friction surfaces or other means of engaging the freight 120. Although shown in FIG. 5 as being a series of linear, parallel groves or ribs, other patterns and types of friction surfaces are possible.

Figure 8:
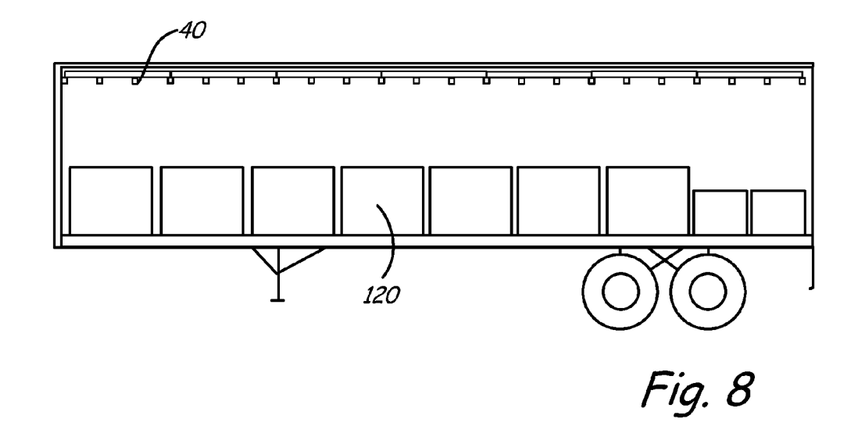
FIG. 8 is a side view of a trailer with a side removed to illustrate the deck system of the present invention in a stored position.
Figure 9:
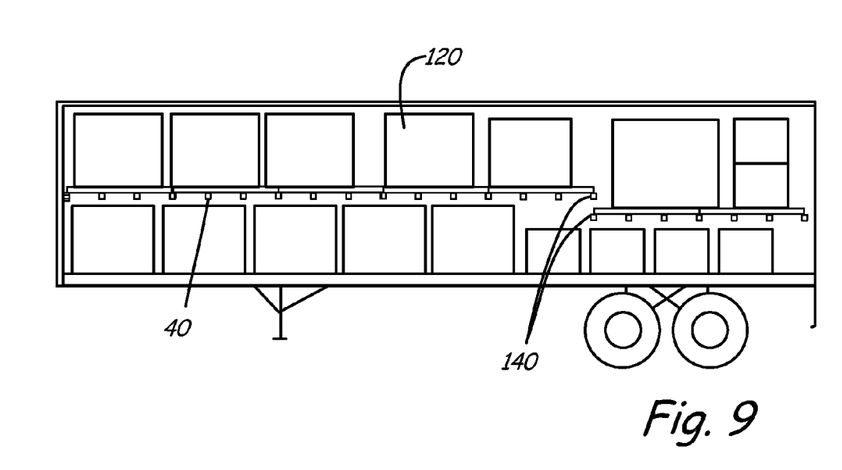
FIG. 9 is a side view of a trailer with a side removed to illustrate an alternate stacking arrangement made possible by the present invention.
Figure 10:
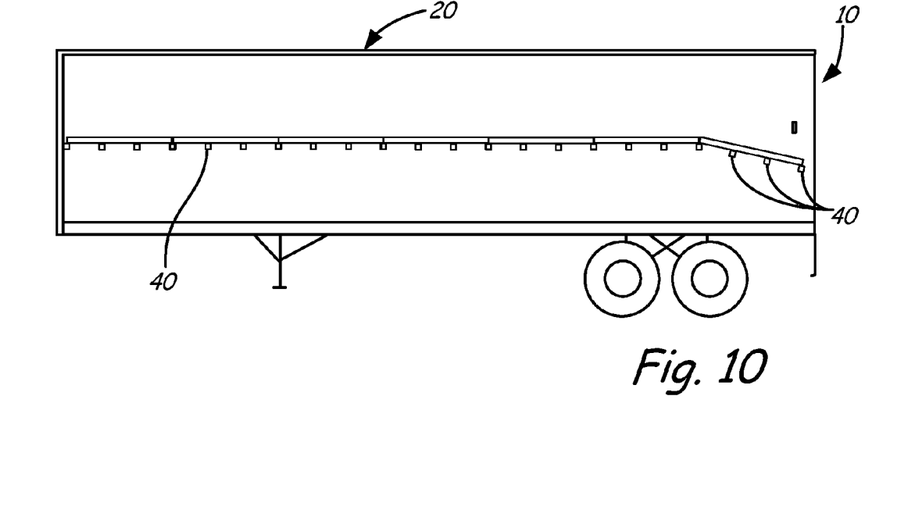
FIG. 10 is a side view of a trailer with a side removed to illustrate an alternate stacking arrangement with a ramp arrangement for loading or unloading freight.

Deck sections 70 are mounted to and between parallel E-bars 40. The front and back ends of the deck sections 70 partially extend onto an E-bar 40, about half the width of the E-Bar 40, as shown in FIGS. 8-10. This permits one E-Bar to simultaneously support two adjoining deck sections 70. However, each deck section 70 may be mounted on two or more E-bars 40 for movement and positioning independent of the other deck sections 70. In the event two adjacent deck sections 70 are positioned at different heights, as shown in FIG. 9, a second E-bar 40 may be attached to corresponding logistics posts 30, 32 so that each E-bar 40 on the logistic post supports a different deck section 70, as is shown by the vertically aligned E-bars 140. (The logistic posts are not shown).

Figure 11:
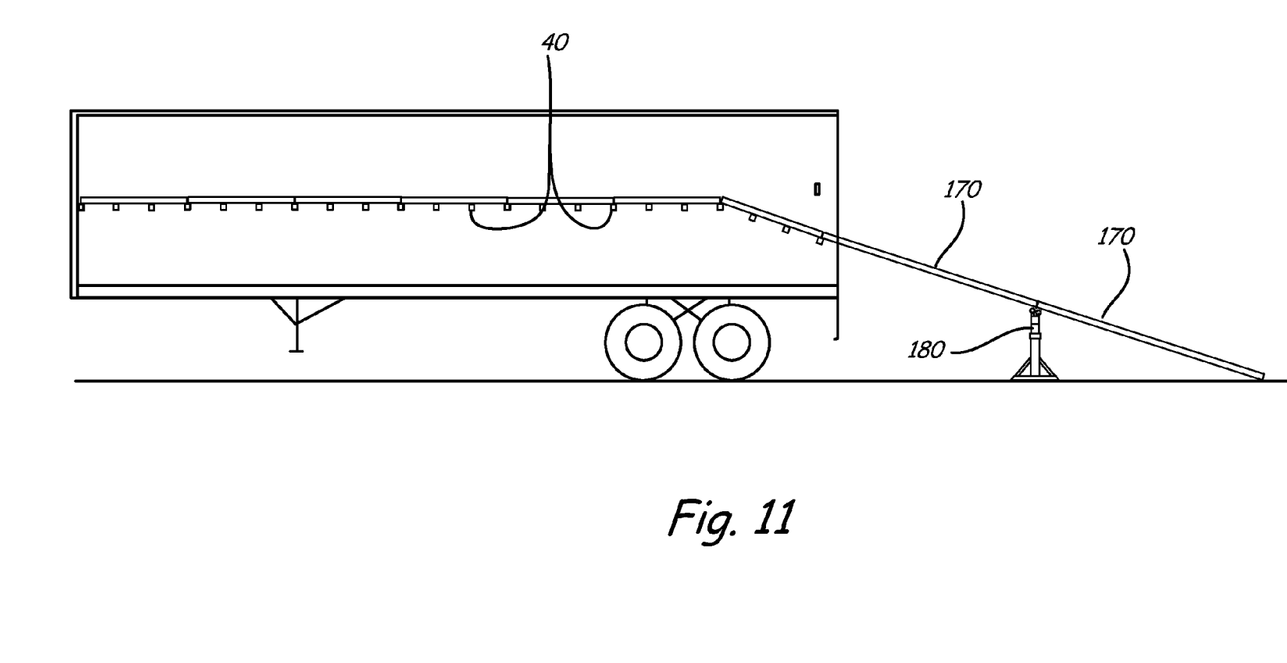
FIG. 11 is a side view of a trailer with a side removed to illustrate a stacking and loading arrangement made possible by the present invention.

As generally disclosed in FIGS. 10 and 11, most (or all) of the E-bars 40 and deck sections may be positioned at the same vertical height to establish a first and second floor to transport freight 120. However, a series of E-bars 40 at the back end 10 of a trailer 20 may be vertically stepped down to support a deck section 70 in an inclined orientation for use as a ramp for loading or unloading freight 120.

When carrying a double load of freight roughly all the same size, the E-bars 40 are positioned about mid-height of the trailer. When transporting cargo that requires most or all of the vertical space in the trailer, the deck sections 70 and E-bars 40 can be positioned adjacent the ceiling of the trailer in a "stored" position, as shown in FIG. 8.

Figure 12:
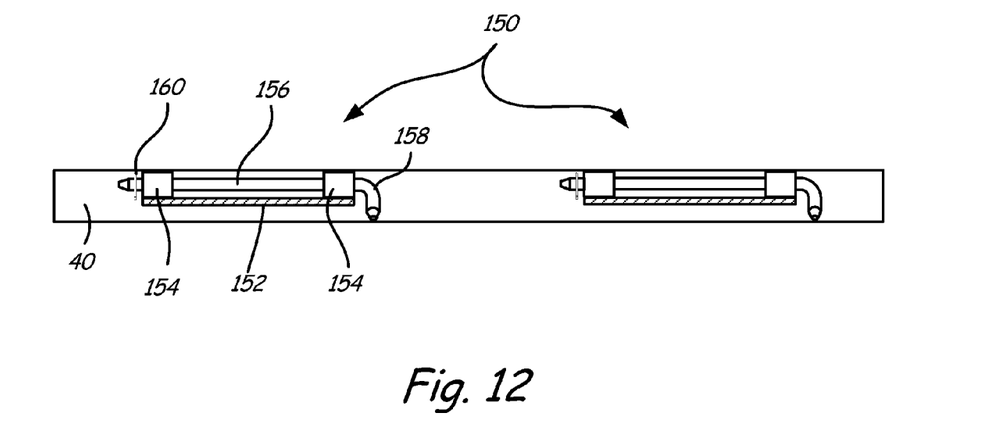
FIG. 12 is an end view of a back end of a trailer illustrating mounting bars secured to an E-bar for attaching a ground ramp.
Figure 13:
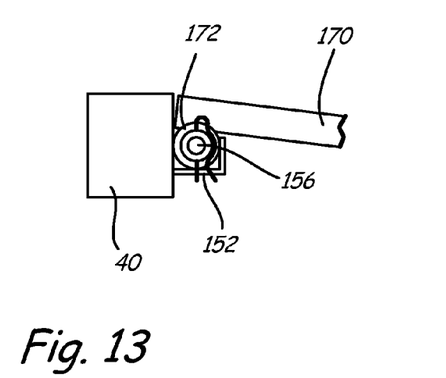
FIG. 13 is a partial side view of a back end of a trailer illustrating a ground ramp secured to an E-bar.
Figure 14:
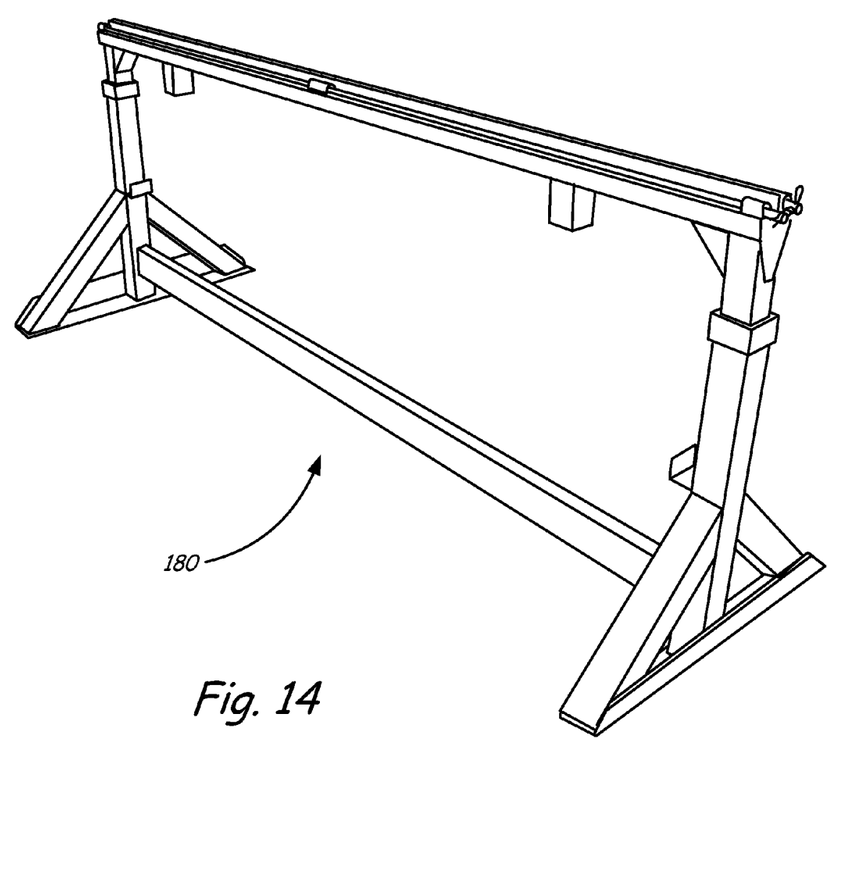
FIG. 14 is a perspective view of a ground ramp support.

FIGS. 11-14 disclose how an extended ramp can be connected to the deck system to load or unload cargo. As shown in FIG. 12, two bar lock ramp connectors 150 known in the industry are secured to an E-bar 40 in spaced relation. Each connector consists of a U-shaped trough 152 with pipe ends 154 for slidably receiving a lock bar 156. Lock bar 156 is generally linear with a curved end 158 to prevent the bar from sliding all the way through the pipe ends 154. Once lock bar 156 is slid through both pipe ends 154, a cotter key 160 locks the lock bar 156 in place, mounted through and between the pipe ends 154.

Carried on the bottom end of a ramp section 170 is a pipe 172 positioned to rest in the U-shaped trough 152 of the ramp connector 170, intermediate the pipes 154, when the ramp section 170 is secured to the ramp connector 150. The ramp 170 is connected to the ramp connector 150 by first removing the lock bar from the ramp connector 150, then mounting the ramp pipe 172 in the U-shaped trough 152. The lock bar 156 is slid through a first pipe end 154, through the ramp pipe 172 and through the second pipe end 154 and is secured in place by the cotter key 160.

Because of the height of the deck system, it may take more than one ramp section to reach from the ground to the deck system to load or unload cargo. Therefore, a ramp support 180, shown in FIGS. 11 and 14, which is height adjustable, may be required to support two ramp sections 170 connected in end-to end relation to reach the deck system. Ramp connectors, similar to ramp connector 150, are mounted on the ramp support 180 to secured adjoining ends of the ramp sections 170 and the ramp support 180 together.

Figure 7:
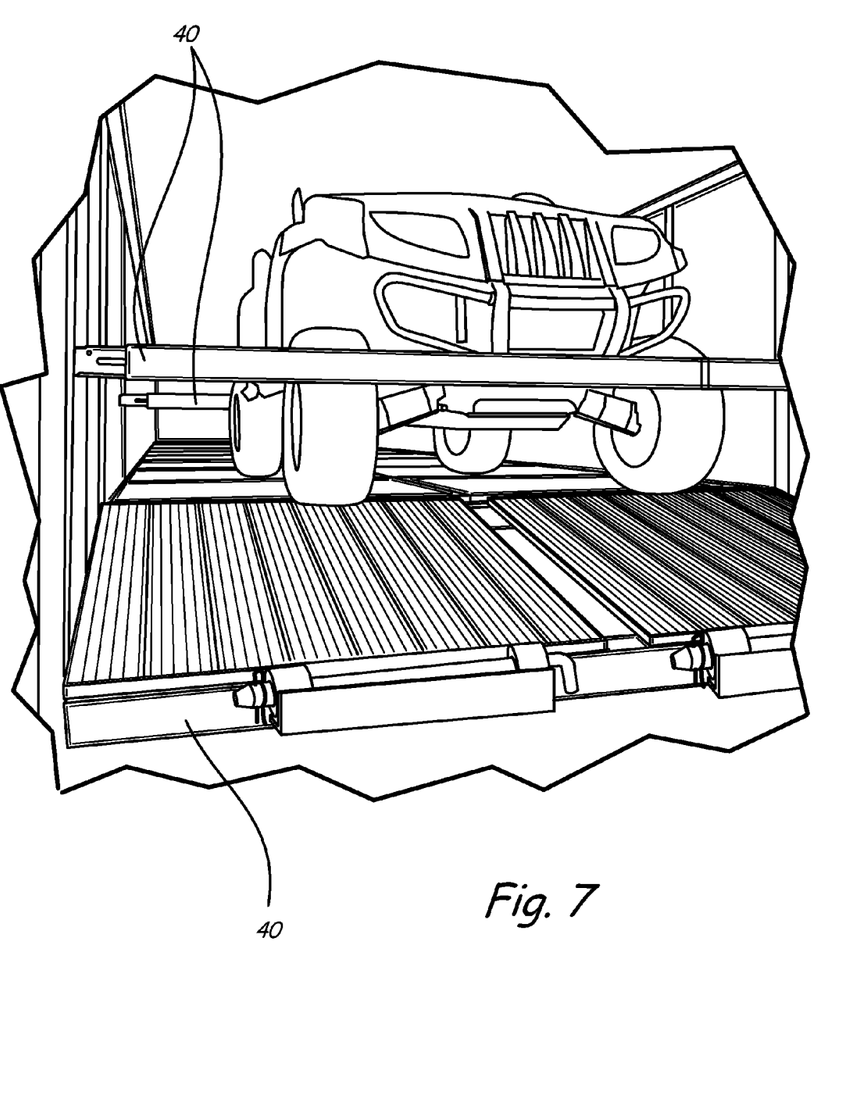
FIG. 7 is a partial perspective view of a number of deck sections mounted at the same height to support cargo and one deck section mounted at an incline to create a ramp at the rear of the trailer for loading and unloading freight.

In use, no special tools are required to adjust the deck system to a desired orientation. The E-bars 40 are easily hand raised to a desired height; the deck sections 40 can be hand mounted on and secured to the E-bars 40 by elastic chords 136; the E-bars 40 can be set at the same height, staggered heights or stepped to create any formation of deck sections as is desired; multiple E-bars 40 may be mounted on a given pair of corresponding logistics posts 30, 32 as required to create staggered, discrete sections for supporting cargo; and the deck sections 70 may be easily hand added, removed or stacked on each other to use the cargo space most efficiently, since the deck sections 70 are not permanently fixed to the E-bars 40. E-bars 40 may also be used to keep cargo held in position as illustrated in FIG. 7, a loaded golf cart held in place by a raised E-bar positioned in front of the golf cart and another E-bar 40 positioned behind the golf cart. All of this saves time and labor, a critical factor in controlling the cost of transportation of cargo.

Cargo is usually loaded into a trailer from the front of the trailer to the back of the trailer. When different levels of deck are required to handle a load of cargo, the back sections of the deck system are easily stored at the ceiling height of the trailer, out of the way, as a forward section or module of the deck system is being loaded.

E-bars 40 may include reflectors 42. When loading the trailer, lights mounted on fork lifts or other loading equipment reflect off of the reflectors 42, making it easier to see the E-bars in the darker forward region of the semi-trailer 20.

Figure 15:
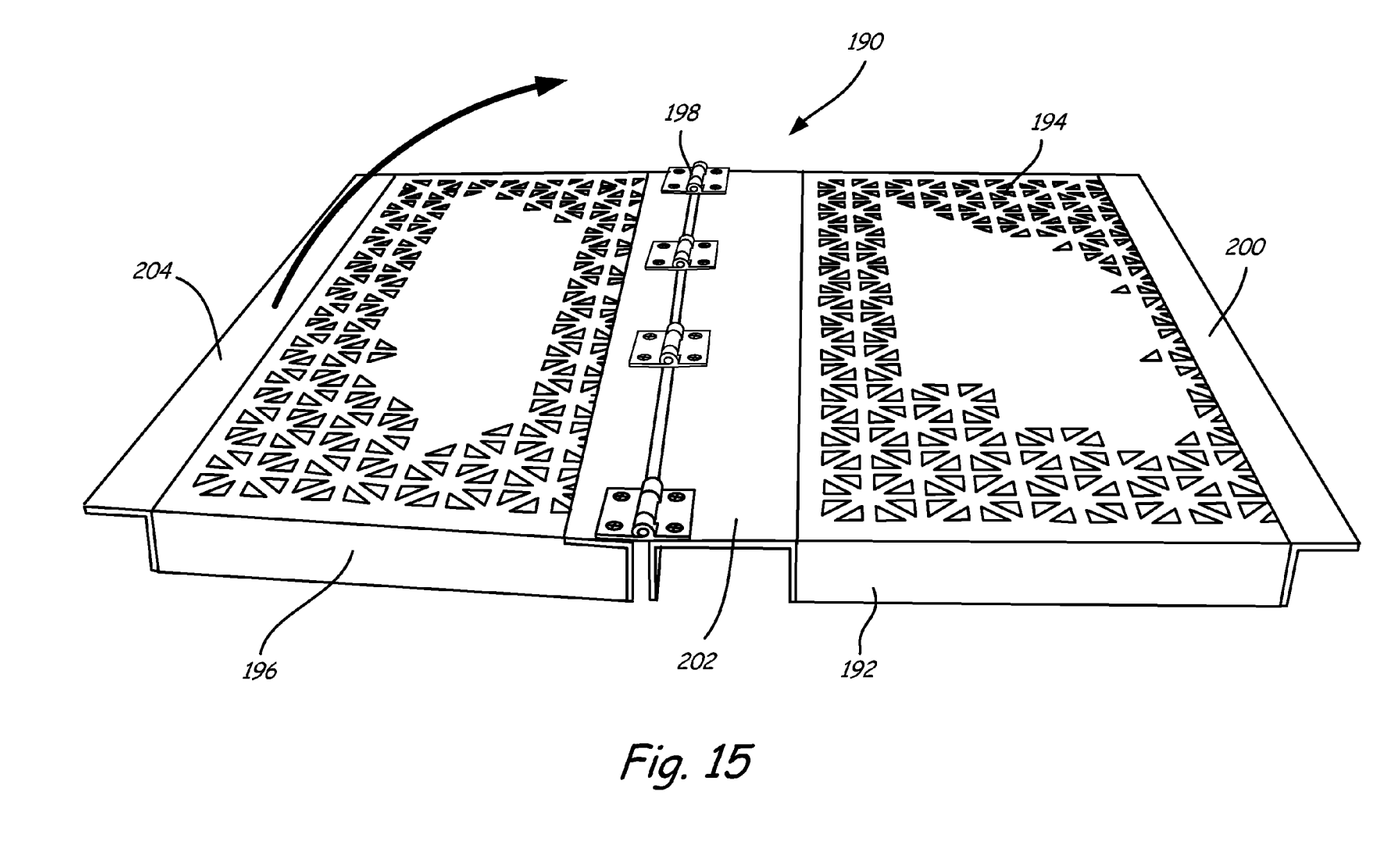
FIG. 15 is a perspective view of an alternate embodiment of a deck panel.

FIG. 15 discloses an alternative embodiment of a deck section. This alternate deck section 190 includes a first panel section 192 with a perforated support surface 194. This panel section has a reduced weight and permits air to circulate through the panel section. An L-shaped E-bar engaging flange 200 is defined along a first side edge of the panel section 192. A U-shaped E-bar engaging saddle 202 is defined along an opposite panel side edge so that panel section 192 can be mounted on and between two E-bars (not shown).

A second panel section 196 is pivotally secured by hinges 198 to U-shaped E-bar engaging saddle 202 for pivotal movement between a mounted position on the E-bars and an open position rotated on top of panel section 192.

Along an edge of panel section 196 opposite that of the U-shaped E-bar engaging saddle, is a second E-bar engaging flange 204. This arrangement permits panel section 196 to be mounted adjacent to panel section 192, sharing a common E-bar. The pivotal arrangement of panel section 196 allows panel section 196 to be rotated upward and over panel section 192 to provide access to the cargo area above the panel sections.

This alternate embodiment of a deck section can be quickly secured to the cross beams by elastic chords or other means known in the art as described above.

Although not discussed in detail here, other arrangements of the deck system and its various components are contemplated by the present invention.

What is claimed is:

1. A deck system for use in a trailer having first and second side walls, comprising:
   a. at least two first logistics posts having multiple E-bar mounting positions secured to the inside of a first side wall of the trailer in spaced relation along the length of the trailer for receiving a first end of an E-bar;
   b. at least two second logistics posts having multiple E-bar mounting positions secured to the inside of a second side wall of the trailer in spaced relation along the length of the trailer for receiving a second end of an E-bar, each second logistic post being substantially transversely aligned with a corresponding first logistics post to support an E-bar there between;
   c. at least two E-bars having first and second ends, each E-bar being adjustably mounted at a first end to a first logistics post and at a second end to a corresponding second logistics post, wherein the E-bars are adjustably, slidably mounted to the logistics posts for vertical movement up and down; and
   d. a least one deck section covering substantially the entire width of the trailer, mounted on and between the E-bars for supporting cargo.

2. The deck system of claim 1 wherein the deck section includes a generally rectangular support platform with selectively positioned E-bar engaging means for engaging the E-bars to prevent movement of the support platform with respect to the E-bars.

3. The deck system of claim 1 wherein the E-bars have a generally rectangular cross section and the deck section includes a generally rectangular support platform with selectively positioned flanges extending perpendicular from a bottom of the support platform for engaging the E-bars to prevent transverse movement of the support platform with respect to the E-bars.

4. The deck system of claim 1 wherein the deck section includes a generally rectangular support platform comprising a series of panel sections secured together in side by side relation, and selectively positioned E-bar engaging means secured to the support platform for engaging the E-bars to prevent transverse movement of the support platform with respect to the E-bars.

5. The deck system of claim 1 wherein the deck section includes a generally rectangular support platform with selectively positioned L-shaped flanges secured to a bottom surface of the support platform, a first leg of the L-shaped flange being secured to the bottom of the support platform and a second leg extending perpendicularly outward from the bottom surface of the support platform to engage the E-bars.

6. The deck system of claim 5 wherein the L-shaped flanges act as wear surfaces with respect to the E-bars.

7. The deck system of claim 1 further comprising friction means for frictionally engaging cargo to be supported on the deck section.

8. The deck system of claim 1 further including vertical stabilization means for preventing the deck sections from vertically separating from the E-bars.

9. The deck system of claim 1 further including reflectors secured to the E-bars.

10. The deck system of claim 1 wherein the deck section includes:

a. a first section panel with a first E-bar engaging means on a first side and a second E-bar engaging means on an opposite side; and
 b. a second section panel having an E-bar engaging means on a first side and being pivotally secured on a second side to the second E-Bar engaging means.

11. The deck system of claim 1 wherein the deck section is perforated.

12. The deck system of claim 1 wherein the deck sections are constructed of aluminum or aluminum alloy.

13. The deck system of claim 1 where there are two deck sections mounted between the E-bars in side-by-side relation covering substantially the entire width of the trailer.

\* \* \* \* \*

UNITED STATES PATENT AND TRADEMARK OFFICE
CERTIFICATE OF CORRECTION

| | | |
|---|---|---|
| PATENT NO. | : 8,123,282 B1 | Page 1 of 1 |
| APPLICATION NO. | : 12/895234 | |
| DATED | : February 28, 2012 | |
| INVENTOR(S) | : Miller | |

It is certified that error appears in the above-identified patent and that said Letters Patent is hereby corrected as shown below:

Column 8, line 41 (Claim 1) "d. a least one deck section" should be -- d. at least one deck section --.

Signed and Sealed this
Third Day of April, 2012

David J. Kappos
*Director of the United States Patent and Trademark Office*